UNITED STATES PATENT OFFICE.

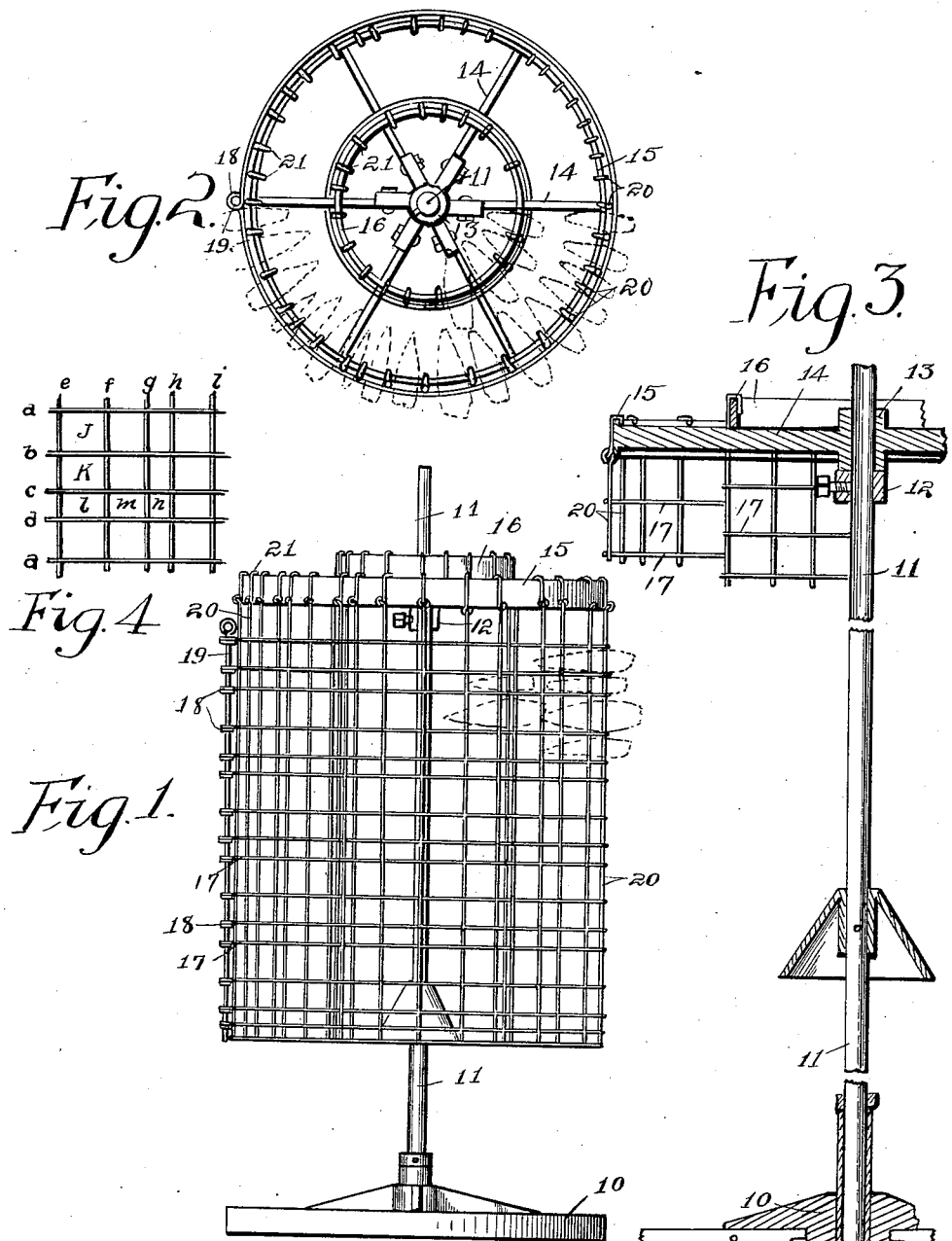

SOLOMON B. WENGER, OF SOUTH ENGLISH, IOWA.

CORN-RACK.

1,095,687.

Specification of Letters Patent.

Patented May 5, 1914.

Application filed November 6, 1913. Serial No. 799,623.

*To all whom it may concern:*

Be it known that I, SOLOMON B. WENGER, a citizen of the United States, residing at South English, in the county of Keokuk and State of Iowa, have invented a certain new and useful Corn-Rack, of which the following is a specification.

The object of my invention is to provide a rack of simple, durable and inexpensive construction designed to contain and support ears of corn in such a manner that a relatively large number of ears may be contained in a small space and the ears be all readily and easily accessible to be placed therein or removed therefrom, and to support the ears out of contact with each other so that they may be thoroughly dried; and further to provide a device of this kind that may be readily and quickly taken apart for shipping or storing purposes.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a side elevation of a rack embodying my invention. The dotted lines indicate the positions of the ears of corn therein. Fig. 2 shows a top or plan view of same. Fig. 3 shows a detail, vertical, sectional view of part of my improved corn rack, and Fig. 4 shows a view of part of one of the woven wire rack members to illustrate the spacing of the wires.

Referring to the accompanying drawings, I have used the reference numeral 10 to indicate the base of the device having a central opening to receive an upright pipe or standard 11. Near the top of the standard 11 is a detachable collar 12 on top of which is supported a hub 13 having radial arms 14 and a rim 15. Resting on top of the radial arms 14 is a second and smaller rim 16.

There are two corn holders provided, each of which is of cylindrical form and is composed of vertical and transverse wires having rectangular spaces therein. To form these cylindrical wire corn holders, a length of the woven wire is first provided and the ends of the horizontal wires 17 are provided with loops 18, and the loops are brought to overlapping positions, and a rod 19 is extended through them. At the upper ends of the vertical wires 20 is a series of hooks 21 to hook over the tops of the rims 15 and 16 to thereby support the cylindrical corn holders from said rims.

In my improved corn rack, it is the object to support an ear of corn in a rectangular opening in only a single piece of woven wire. In this connection, it is to be remembered that ears of corn vary a considerable extent in diameter and obviously if the woven wire had a mesh of a certain size, it will accurately fit only a small part of the ears to be supported. For this reason, I have formed a woven wire mesh of peculiar construction which is clearly illustrated in Fig. 4. The horizontally arranged wires are arranged in series of fours: $a$, $b$, $c$, and $d$. $a$ and $b$ are separated far enough apart to admit the largest ears of corn between them. $b$ and $c$ are closer together. The vertically arranged wires are also arranged in series of fours: $e$, $f$, $g$ and $h$. The wires $e$ and $f$ are spaced apart as wide as the diameter of the largest ears of corn. $f$ and $g$ are closer together and $g$ and $h$ are still closer together, and in this manner the entire wire rack is formed.

In placing ears of corn in the rack, the operator can readily and easily determine by the size of the ear just which one of the spaces the ear will most accurately fit; that is to say, if the ear is large it is placed in one of the spaces $j$. If of medium size it is placed in one of the spaces $k$. If smaller it is placed in one of the spaces $l$. If still smaller it is placed in one of the spaces $m$ and the smallest sizes are placed in the spaces $n$. In each instance however, the ear of corn is fitted into the space in which it is placed in such a manner that it fits tightly enough to be held and supported in a substantially horizontal position by the one frame of woven wire.

In practical use the inner cylinder of woven wire is first placed in position and the spaces therein are filled with ears of corn in the manner stated. Then the outer cylinder of wire is placed in position and the spaces therein are filled. In this way a comparatively large amount of corn is placed in a relatively small space and none of the ears are in contact with each other. After the ears are removed the woven wire cylinders may be readily and easily detached and laid flat or left up as desired and the rims at the top may also be detached from the standard or pipe 11 so that the entire device may be stored in a small space.

I claim as my invention:

1. An improved corn rack, comprising a standard, radial arms supported at the top of the standard, a rim secured to the ends of said radial arms, a second rim detachably mounted on top of the radial arms, a cylindrical wire mesh rack supported from the inner rim, a second cylindrical wire mesh rack supported from the outer rack and spaced apart from the inner rim, each of said racks being capable of supporting ears of corn placed between the wires thereof.

2. An improved corn rack, comprising a suitable base, a standard mounted in the base, radial arms detachably arranged at the top of the base, a rim at the outer ends of the radial arms, a second smaller rim supported on top of the radial arms, and two cylindrical wire mesh corn racks, each comprising a piece of woven wire having some of the vertical and horizontal wires therein spaced apart at different distances to thereby form spaces for the reception of ears of corn, which spaces are of different sizes, means for detachably connecting together the ends of each of the woven wire rack members, and hooks fixed to the tops of the woven wire members and detachably connected with the said rims, substantially as and for the purposes stated.

Des Moines, Iowa, September 11, 1913.

SOLOMON B. WENGER.

Witnesses:
ELLA KEPPLER,
A. MELLINGER, Jr.

---

Copies of this patent may be obtained for five cents each, by addressing the "Commissioner of Patents, Washington, D. C."